(12) United States Patent
Thiagarajan et al.

(10) Patent No.: US 7,149,415 B2
(45) Date of Patent: Dec. 12, 2006

(54) PROGRAM RECORDING COMPLETION

(75) Inventors: Balaji Thiagarajan, San Jose, CA (US); Parichay Saxena, Milpitas, CA (US)

(73) Assignee: Microsoft Corporation, Redmond, WA (US)

( * ) Notice: Subject to any disclaimer, the term of this patent is extended or adjusted under 35 U.S.C. 154(b) by 1108 days.

(21) Appl. No.: 10/154,769

(22) Filed: May 23, 2002

(65) Prior Publication Data

US 2003/0219228 A1 Nov. 27, 2003

(51) Int. Cl.
*H04N 7/64* (2006.01)
*H04N 5/91* (2006.01)
*H04N 5/445* (2006.01)

(52) U.S. Cl. .................. 386/113; 386/83; 725/39; 725/58

(58) Field of Classification Search ............ 386/1, 386/4, 18, 46, 52–55, 60–63, 83, 94; 725/39, 725/58; 710/6, 25, 45, 52
See application file for complete search history.

(56) References Cited

U.S. PATENT DOCUMENTS

| 5,345,430 | A | * | 9/1994 | Moe .............................. 369/7 |
| 5,805,763 | A | | 9/1998 | Lawler et al. |
| 5,935,206 | A | | 8/1999 | Dixon et al. |
| 6,263,147 | B1 | * | 7/2001 | Tognazzini ............... 386/46 |
| 6,363,440 | B1 | * | 3/2002 | Stepp et al. ............... 710/52 |
| 2001/0051037 | A1 | * | 12/2001 | Safadi et al. ............. 386/83 |
| 2003/0198461 | A1 | * | 10/2003 | Taylor et al. ............. 386/83 |

OTHER PUBLICATIONS

Morgan, et al.; Coming: Set-Top Box Recording; IEEE Spectrum; Feb. 2002; pp. 18-21; www.spectrum.ieee.org.

* cited by examiner

*Primary Examiner*—Thai Q. Tran
*Assistant Examiner*—Mishawn Dunn
(74) *Attorney, Agent, or Firm*—Lee & Hayes, PLLC

(57) ABSTRACT

A program recording completion system automatically completes an incomplete program recording of a program. A recording application creates a program recording completion event corresponding to the incomplete program recording which includes program information to automatically complete the incomplete program recording. The recording application can initiate recording a re-broadcast of the program to create a complete program recording, or the recording application can record a segment of a re-broadcast of the program and combine the program segment with the incomplete program recording to create a complete program recording.

55 Claims, 6 Drawing Sheets

PROGRAM RECORDING COMPLETION

TECHNICAL FIELD

This invention relates to television entertainment architectures and, in particular, to a program recording completion system.

BACKGROUND

Client devices in a television-based entertainment system can be viewer enabled to record broadcast programs such as television shows, movies, sporting events, and similar broadcast video content. A program guide can be displayed on a television connected to a client device to display program information such as a program title, the associated local channel number, and a time of the day that the program will be broadcast. A viewer can select to view the program if it is currently being broadcast, access program data to learn more about the program, and/or enter a request to record the program.

When a viewer schedules, or otherwise requests, a record event at a client device to record a particular program, the client device records the program when it is broadcast and stores the recorded program so that the viewer may watch the program in its entirety at a later time. However, quite often a viewer will begin watching a program and, after the broadcast of the program has started, decide to record the program. This type of impulse record request results in the client device recording the remainder of the program as it is broadcast. The recorded program, however, is incomplete because a beginning segment of the program, before the viewer decided to initiate the recording, is not recorded.

In addition to a program recording being incomplete due to an impulse record request, a program recording can be incomplete because a scheduled recording of the program is interrupted, either because a viewer stops the recording before the program broadcast is complete, or because system resources became unavailable to continue with the recording. Further, a program recording may be incomplete due to system power failure, due to a loss of the broadcast communication, or due to any number of other interruption events not within a viewer's control. A television viewer expecting to have recorded a particular program in its entirety will be disappointed to find that the recording of the program is incomplete and will not be able to watch the entire program.

Accordingly, for television-based entertainment systems, there is a need for techniques to automatically complete a program recording that has been only partially recorded and/or interrupted resulting in an incomplete recording of a requested program.

SUMMARY

A program recording completion system automatically completes an incomplete program recording of a program. A program recording will be incomplete when a recording of the program is interrupted before the end of the program broadcast and/or when the program is only partially recorded, such as when a viewer begins watching a program and then decides to record the program after the broadcast has already started. A recording application creates a program recording completion event corresponding to the incomplete program recording which includes program information to automatically complete the incomplete program recording. The recording application can initiate recording a re-broadcast of the program to create a complete program recording, or the recording application can record a segment of a re-broadcast of the program and combine the program segment with the incomplete program recording to create a complete program recording.

BRIEF DESCRIPTION OF THE DRAWINGS

The same numbers are used throughout the drawings to reference like features and components.

DETAILED DESCRIPTION

A program recording completion system is described that automatically completes an incomplete program recording of a program. A program recording will be incomplete when a recording of the program is interrupted before the end of the program broadcast and/or when the program is only partially recorded, such as when a viewer begins watching a program and then decides to record the program after the broadcast has already started. A recording application creates a program recording completion event corresponding to the incomplete program recording which includes program information to automatically complete the incomplete program recording. The recording application can initiate recording a re-broadcast of the program to create a complete program recording, or the recording application can record a segment of a re-broadcast of the program and combine the program segment with the incomplete program recording to create a complete program recording.

The following discussion is directed to television-based entertainment systems, such as interactive TV networks, cable networks that utilize electronic program guides, and Web-enabled TV networks. Client devices in such systems range from full-resource clients with substantial memory and processing resources, such as TV-enabled personal computers and TV recorders equipped with hard-disks, to low-resource clients with limited memory and/or processing resources, such as traditional set-top boxes. While aspects of the described systems and methods can be used in any of these systems and for any types of client devices, they are described in the context of the following exemplary environment.

Exemplary System Architecture

Figure 1:
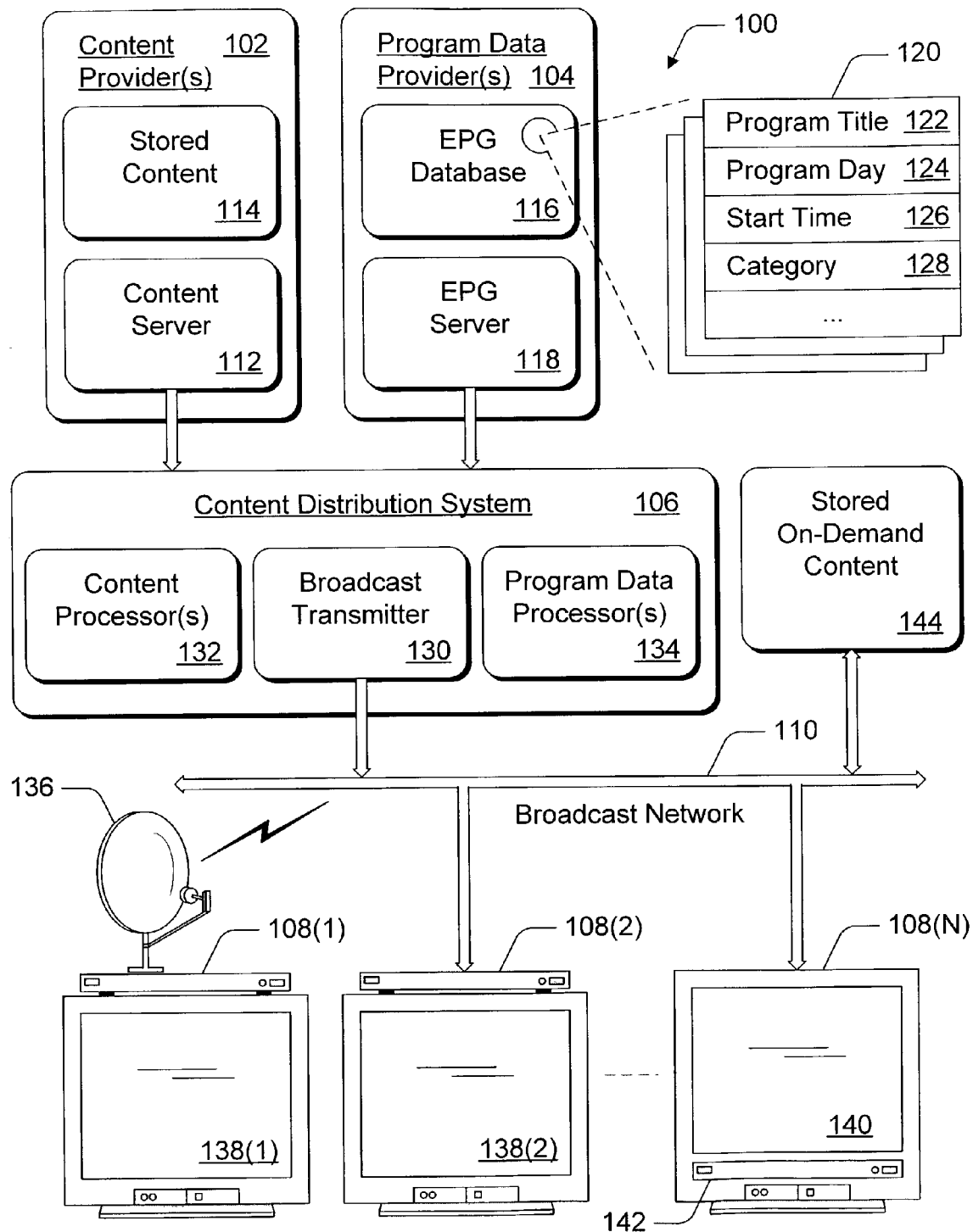
FIG. 1 illustrates an exemplary system architecture in which the systems and methods for a program recording completion system can be implemented.

FIG. 1 illustrates an exemplary television entertainment system 100 that is an architecture in which a program recording completion system can be implemented. System 100 facilitates distribution of content and program data to multiple viewers, and includes components of a program recording completion system that automatically completes an incomplete program recording. The system 100 includes one or more content providers 102, one or more program data providers 104, a content distribution system 106, and multiple client devices 108(1), 108(2), . . . , 108(N) coupled to the content distribution system 106 via a broadcast network 110.

Content provider 102 includes a content server 112 and stored content 114, such as movies, television programs, commercials, music, and similar audio and/or video content. Content server 112 controls distribution of the stored content 114 from content provider 102 to the content distribution system 106. Additionally, content server 102 controls distribution of live content (e.g., content that was not previously stored, such as live feeds) and/or content stored at other locations to the content distribution system 106. Program data provider 104 includes an electronic program guide (EPG) database 116 and an EPG server 118. The EPG database 116 stores electronic files of program data (or, "EPG data") which is used to generate an electronic program guide (or, "program guide").

An electronic file maintains program data 120 that may include a program title 122, program broadcast day(s) 124 to identify which days of the week the program will be shown, program start times(s) 126 to identify a time that the program will be shown on the particular day or days of the week, and a program category 128. A program category describes the genre of a program and categorizes it as a particular program type. For example, a program can be categorized as a movie, a comedy, a sporting event, a news program, or as any number of other category descriptions. Program data can also include program ratings, characters, descriptions, actor names, station identifiers, channel identifiers, schedule information, and so on.

The EPG server 118 processes the program data prior to distribution to generate a published version of the program data which contains programming information for all channels for one or more days. The processing may involve any number of techniques to reduce, modify, or enhance the program data. Such processes might include selection of content, content compression, format modification, and the like. The EPG server 118 controls distribution of the published version of the program data from program data provider 104 to the content distribution system 106 using, for example, a file transfer protocol (FTP) over a TCP/IP network (e.g., Internet, UNIX, etc.). Further, the published version of the program data can be transmitted from program data provider 104 via a satellite directly to a client device 108.

Content distribution system 106 includes a broadcast transmitter 130, one or more content processors 132, and one or more program data processors 134. Broadcast transmitter 130 broadcasts signals, such as cable television signals, across broadcast network 110. Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks.

A content processor 132 processes the content received from content provider 102 prior to transmitting the content across broadcast network 110. Similarly, a program data processor 134 processes the program data received from program data provider 104 prior to transmitting the program data across broadcast network 110. A particular content processor 132 may encode, or otherwise process, the received content into a format that is understood by the multiple client devices 108(1), 108(2), . . . , 108(N) coupled to broadcast network 110. Although FIG. 1 shows a single content provider 102, a single program data provider 104, and a single content distribution system 106, exemplary system 100 can include any number of content providers and/or program data providers coupled to any number of content distribution systems.

Content distribution system 106 is representative of a headend service that provides EPG data, as well as content, to multiple subscribers. Each content distribution system 106 may receive a slightly different version of the program data that takes into account different programming preferences and lineups. The EPG server 118 creates different versions of EPG data (e.g., different versions of a program guide) that include those channels of relevance to respective headend services, and the content distribution system 106 transmits the EPG data to the multiple client devices 108(1), 108(2), . . . , 108(N). In one implementation, for example, content distribution system 106 utilizes a carousel file system to repeatedly broadcast the EPG data over an out-of-band (OOB) channel to the client devices 108.

Client devices 108 can be implemented in a number of ways. For example, a client device 108(1) receives broadcast content from a satellite-based transmitter via a satellite dish 136. Client device 108(1) is also referred to as a set-top box or a satellite receiving device. Client device 108(1) is coupled to a television 138(1) for presenting the content received by the client device (e.g., audio data and video data), as well as a graphical user interface. A particular client device 108 can be coupled to any number of televisions 138 and/or similar devices that can be implemented to display or otherwise render content. Similarly, any number of client devices 108 can be coupled to a single television 138.

Client device 108(2) is also coupled to receive broadcast content from broadcast network 110 and provide the received content to associated television 138(2). Client device 108(N) is an example of a combination television 140 and integrated set-top box 142. In this example, the various components and functionality of the set-top box are integrated into the television, rather than using two separate devices. The set-top box integrated into the television can receive broadcast signals via a satellite dish (similar to satellite dish 136) and/or via broadcast network 110. In alternate implementations, client devices 108 may receive broadcast signals via the Internet or any other broadcast medium.

Each client device 108 runs an electronic program guide (EPG) application that utilizes the program data. An EPG application enables a television viewer to navigate through an onscreen program guide and locate television shows and other broadcast content of interest to the viewer. With an EPG application, the television viewer can look at schedules of current and future programming, set reminders for upcoming programs, and/or enter instructions to record one or more television shows.

The exemplary system 100 also includes stored on-demand content 144, such as Video On-Demand (VOD) movie content. The stored on-demand content can be viewed with a television 138 via a client device 108 through an onscreen movie guide, for example, and a viewer can enter instructions to stream a particular movie, or other stored content, down to a corresponding client device 108.

Exemplary Client Device

Figure 2:
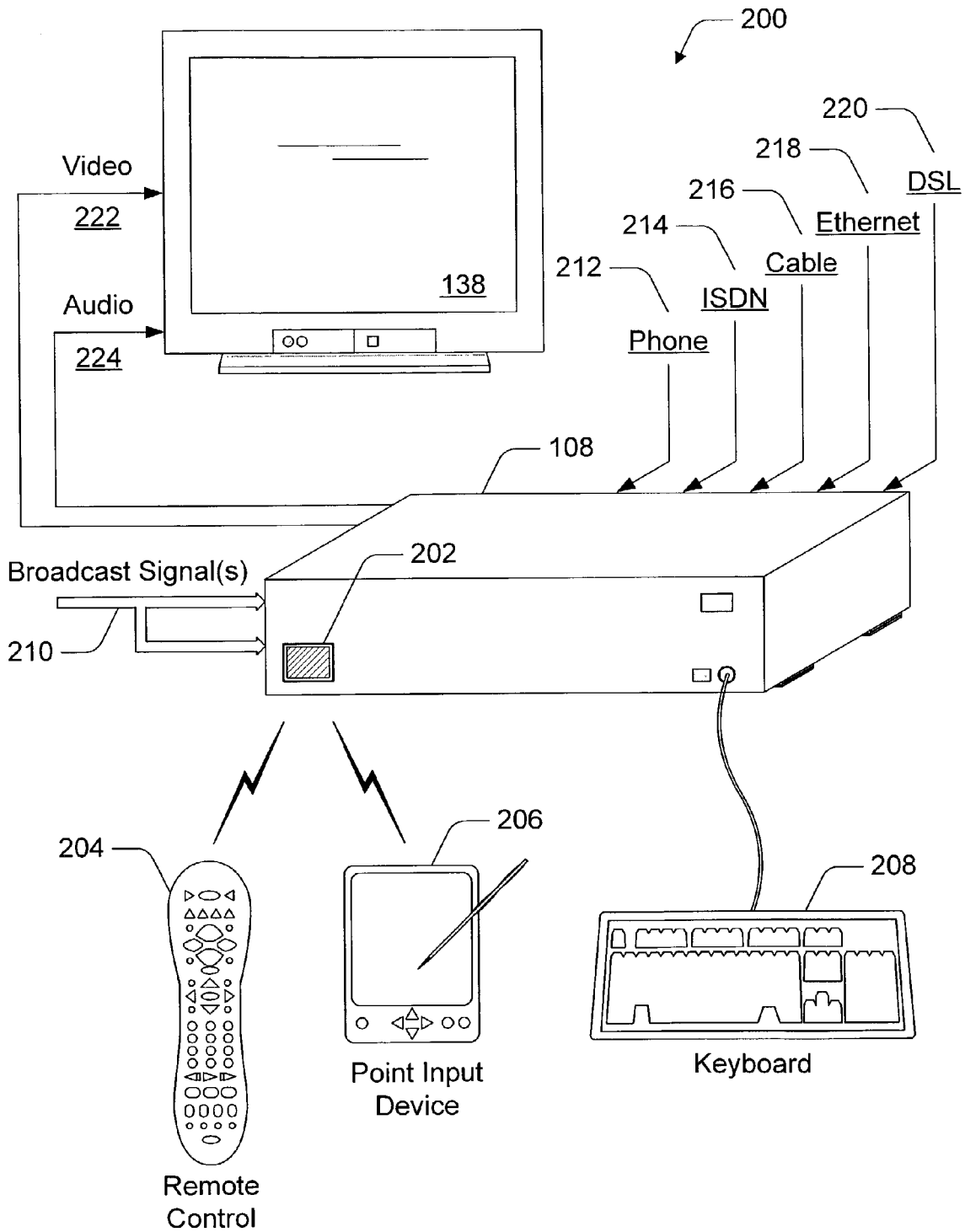
FIG. 2 illustrates an example client device, a television, and various input devices that interact with the client device.

FIG. 2 illustrates an exemplary implementation 200 of a client device 108 shown as a standalone unit that connects to a television 138. Client device 108 can be implemented in any number of embodiments, including as a set-top box, a satellite receiver, a TV recorder with a hard disk, a digital video recorder (DVR) and playback system, a game console, an information appliance, and so forth.

Client device 108 includes a wireless port 202, such as an infrared (IR) or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 can be coupled to communicate with client device 108. In alternate embodiments, remote control device 204, handheld device 206, and/or keyboard 208 may use an RF communication link or other mode of transmission to communicate with client device 108.

Client device 108 receives one or more broadcast signals 210 from one or more broadcast sources, such as from a satellite or from a broadcast network, such as broadcast network 110 (FIG. 1). Client device 108 includes hardware and/or software for receiving and decoding broadcast signal 210, such as an NTSC, PAL, SECAM, or other TV system video signal. Client device 108 also includes hardware and/or software for providing the user with a graphical user interface by which the user can, for example, access various network services, configure the client device 108, and perform other functions.

Client device 108 can communicate with other devices via one or more connections including a conventional telephone line 212, an ISDN link 214, a cable link 216, an Ethernet link 218, a DSL link 220, and the like. Client device 108 may use any one or more of the various communication links 212–220 at a particular instant to communicate with any number of other devices.

Client device 108 generates video signal(s) 222 and audio signal(s) 224, both of which are communicated to television 138. The video signals and audio signals can be communicated from client device 108 to television 138 via an RF (radio frequency) link, S-video link, composite video link, component video link, or other communication link. Although not shown in FIG. 2, client device 108 may include one or more lights or other indicators identifying the current status of the device. Additionally, the client device may include one or more control buttons, switches, or other selectable controls for controlling operation of the device.

Exemplary Program Recording Completion Systems

Figure 3:
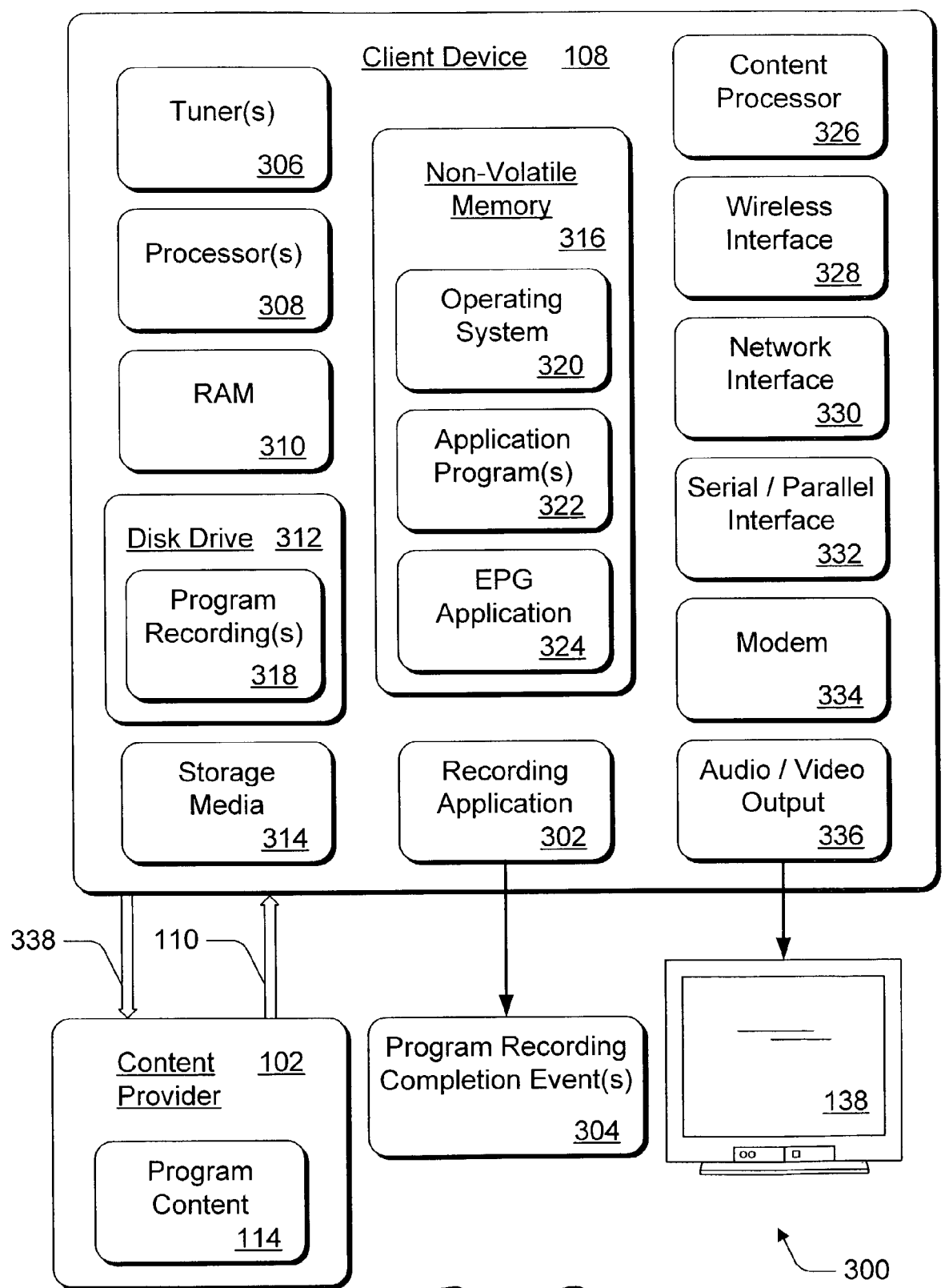
FIG. 3 illustrates components of an exemplary program recording completion system.

FIG. 3 illustrates an exemplary program recording completion system 300 that includes selected components of television system 100, such as a content provider 102 and an exemplary client device 108 as shown in FIGS. 1 and 2. Client device 108 includes components to implement automatic program recording completion of an incomplete program recording maintained with a memory component in client device 108.

Client device 108 includes a recording application 302 that creates program recording completion event(s) 304 which include information to automatically complete an incomplete program recording. The program recording completion event(s) 304 and associated information can be maintained in a data structure, or any other electronic data storage format. Although the program recording completion event(s) 304 is shown as an independent data structure of the program recording completion system 300, the data structure can be maintained with a memory component in client device 108.

Client device 108 includes one or more tuners 306 which are representative of one or more in-band tuners that tune to various frequencies or channels to receive television signals, as well as an out-of-band tuner that tunes to the broadcast channel over which the EPG data is broadcast to client device 108. Client device 108 also includes one or more processors 308 which process various instructions to control the operation of client device 108 and to communicate with other electronic and computing devices.

Client device 108 can be implemented with one or more memory components, examples of which include a random access memory (RAM) 310, a disk drive 312, a mass storage component 314, and a non-volatile memory 316 (e.g., ROM, Flash, EPROM, EEPROM, etc.). The memory components (e.g., RAM 310, disk drive 312, storage media 314, and non-volatile memory 316) store various information and/or data such as received content, EPG data, configuration information for client device 108, and/or graphical user interface information.

Alternative implementations of client device 108 can include a range of processing and memory capabilities, and may include more or fewer types of memory components than those illustrated in FIG. 3. For example, full-resource clients can be implemented with substantial memory and processing resources, including the disk drive 312 to store content for replay by the viewer, such as program recording(s) 318. Low-resource clients, however, may have limited processing and memory capabilities, such as a limited amount of RAM 310, no disk drive 312, and limited processing capabilities of a processor 308.

An operating system 320 and one or more application programs 322 may be stored in non-volatile memory 316 and executed on a processor 308 to provide a runtime environment. A runtime environment facilitates extensibility of client device 108 by allowing various interfaces to be defined that, in turn, allow application programs 322 to interact with client device 108. In the illustrated example, an EPG application 324 is stored in memory 316 to operate on the EPG data and generate a program guide. The application programs 322 that may be implemented in client device 108 can include a browser to browse the Web (e.g., "World Wide Web"), an email program to facilitate electronic mail, and so on. Client device 108 can also include other components pertaining to a television entertainment system which are not illustrated in this example. For instance, client device 108 can include a user interface application and user interface lights, buttons, controls, and the like to facilitate viewer interaction with the device.

Client device 108 also includes a content processor and/or decoder 326 to process and decode a broadcast video signal, such as an NTSC, PAL, SECAM, or other TV system video signal. Content processor 326 can also include a video decoder and/or additional processors to receive, decode, and/or process program content 114 (identified as stored content in FIG. 1) received from content provider 102. For example, content processor 326 may include an MP3 or MPEG-2 (Moving Pictures Experts Group) decoder that decodes MPEG-encoded video and other program content. MPEG-2 supports a variety of audio/video formats, including legacy TV, HDTV (high-definition television), DVD (digital versatile disc), and five-channel surround sound.

Typically, program content 114 includes video data and audio data that corresponds to the video data, and can be analog or digital content. Content processor 326 generates video and/or display content that is formatted for display on display device 138, and generates decoded audio data that is formatted for broadcast by a broadcast device, such as one or more speakers (not shown) in display device 138. Content processor 326 can include a display controller (not shown) that processes the video and/or display content to display corresponding images on display device 138. A display controller can include a microcontroller, integrated circuit, and/or similar video processing component to process the images. It is to be appreciated that the systems and methods described herein can be implemented for any type of encoding format as well as for data and/or content streams that are not encoded.

Client device 108 further includes a wireless interface 328, a network interface 330, a serial and/or parallel interface 332, and a modem 334. Wireless interface 328 allows client device 108 to receive input commands and other information from a user-operated input device, such as from a remote control device or from another IR, Bluetooth, or similar RF input device.

Network interface 330 and serial and/or parallel interface 332 allows client device 108 to interact and communicate with other electronic and computing devices via various communication links. Although not shown, client device 108 may also include other types of data communication interfaces to communicate with other devices. Modem 334 facilitates client device 108 communication with other electronic and computing devices via a conventional telephone line.

Client device 108 also includes an audio and/or video output 336 that provides signals to television 138 or to other devices that process and/or display, or otherwise render, the audio and video data. Although shown separately, some of the components of client device 108 may be implemented in an application specific integrated circuit (ASIC). Additionally, a system bus (not shown) typically connects the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

The recording application 302 can be implemented as a software component, such as a digital video recording (DVR) system application, that executes on a processor 308 and is stored in non-volatile memory 316. In addition to recording application 302 creating program recording completion event(s) 304, the recording application can be configured to perform several functions of a program recording completion system. For example, recording application 302 can store an incomplete program recording in disk drive 312 as a program recording 318.

Further, recording application 302 can initiate recording a program re-broadcast to create a complete program recording which can also be maintained in disk drive 312 as a program recording 318. Alternatively, recording application 302 can initiate recording one or more program segments of a program broadcast and/or of a program re-broadcast, and can store the program segments in disk drive 312 as program recordings 318. Recording application 302 can also generate a complete program recording that includes an incomplete program recording and one or more recorded program segments. Additionally, recording application 302 can communicate a request for a program segment to content provider 102 and receive the entire corresponding program and/or the program segment via a back-channel communication link 338 that connects client device 108 to content provider 102.

Exemplary Program Recording Completion Events

Figure 4:
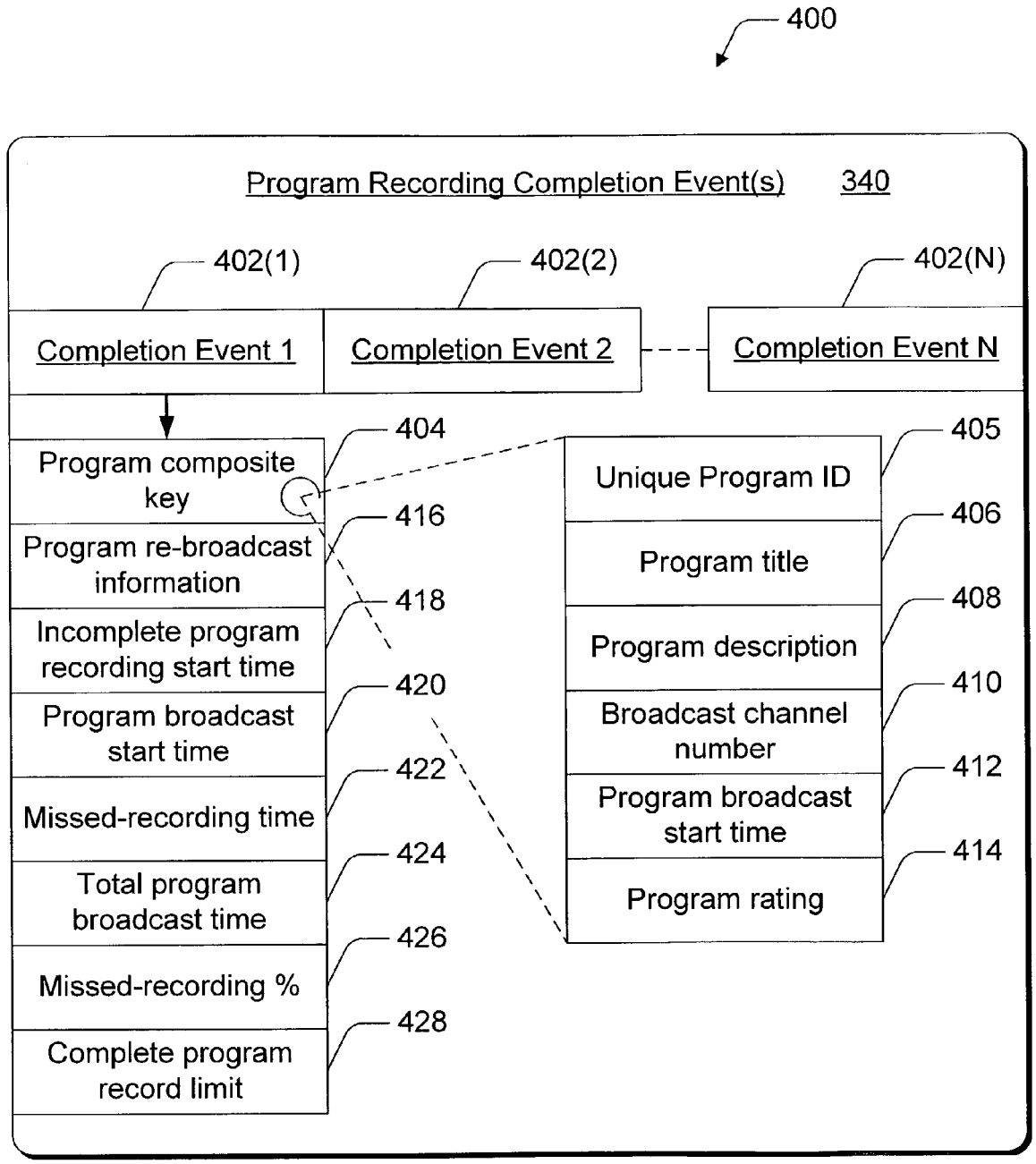
FIG. 4 illustrates an exemplary data structure for program recording completion events.

FIG. 4 illustrates an exemplary data structure 400 implemented to maintain program recording completion event(s) 340 (FIG. 3). Data structure 400 includes completion events 402(1), 402(2), . . . , 402(N) that each include information to automatically complete an incomplete program recording of a program. For purposes of the illustration, only information corresponding to completion event 402(1) is shown in FIG. 4. In practice, each completion event can include corresponding information to automatically complete an incomplete program recording.

Program recording completion event 402(1) corresponds to a particular program and includes a program composite key 404 which uniquely identifies the program broadcast from which an incomplete program recording is created. In an implementation, the program composite key 404 can include key elements such as a unique program identifier 405, a program title 406, a program description 408, a broadcast channel number 410, a program broadcast start time 412, and a program rating 414. These composite key elements can be compared to EPG data in an electronic program guide by the recording application 302 to determine whether the program will be re-broadcast. Those skilled in the art will recognize that any number and combination of these and other composite key elements can be combined to form a unique program composite key for comparison to similar program elements in EPG data in an electronic program guide to determine whether the program will be re-broadcast.

Program recording completion event 402(1) also includes program re-broadcast information 416, such as the date(s), time(s), broadcast channel, and the similar program information, corresponding to when the program will be re-broadcast. When a program re-broadcast is identified in the EPG data, recording application 302 can schedule a record event to record all or part of the program re-broadcast. The record event can include, or otherwise be based on, the program re-broadcast information 416. Those skilled in the art will recognize that a record event can be implemented as a data structure independent of data structure 400 and/or completion event 402(1).

Program recording completion event 402(1) can also include other information corresponding to an incomplete program recording of a program such as an incomplete program recording start time 418, a program broadcast start time 420, and a missed-recording time 422. For example, if a program broadcast start time is 9:00 p.m. and a viewer watches ten minutes of the program before deciding to record the program, the incomplete program recording start time will be 9:10 p.m., and the missed-recording time is ten minutes.

Program recording completion event 402(1) can also include a total program broadcast time 424, a missed-recording percentage 426, and a complete program record limit 428. The missed-recording percentage 426 (i.e., the percentage of the program that was not recorded when recording the incomplete program recording) is a percentage of the missed-recording time 422 to the total program broadcast time 424. Continuing with the program broadcast example, the percentage of the program that was not recorded is equal to ten minutes (i.e., 9:00 p.m. to 9:10 p.m.) divided by a total program broadcast time of one hour (i.e., 60 minutes). In this example, the percentage of the program that was not recorded is 16.6% (sixteen and six-tenths percent).

The complete program record limit 428 can be an application default value or viewer-defined to indicate whether the entire program re-broadcast should be recorded and the incomplete program recording deleted, or whether a second program segment should be recorded and combined with the incomplete program recording to form a complete program recording. For example, if the complete program record limit in this example is 10% (ten percent), then the 16.6% of the program that was not recorded exceeds the complete program record limit and the entire program re-broadcast will be recorded.

Methods for a Program Recording Completion System

Methods for a program recording completion system may be described in the general context of computer-executable instructions. Generally, computer-executable instructions include routines, programs, objects, components, data structures, and the like that perform particular functions or implement particular abstract data types. Methods for a program recording completion system may also be practiced in distributed computing environments where functions are performed by remote processing devices that are linked through a communications network. In a distributed computing environment, computer-executable instructions may be located in both local and remote computer storage media, including memory storage devices.

Figure 5:
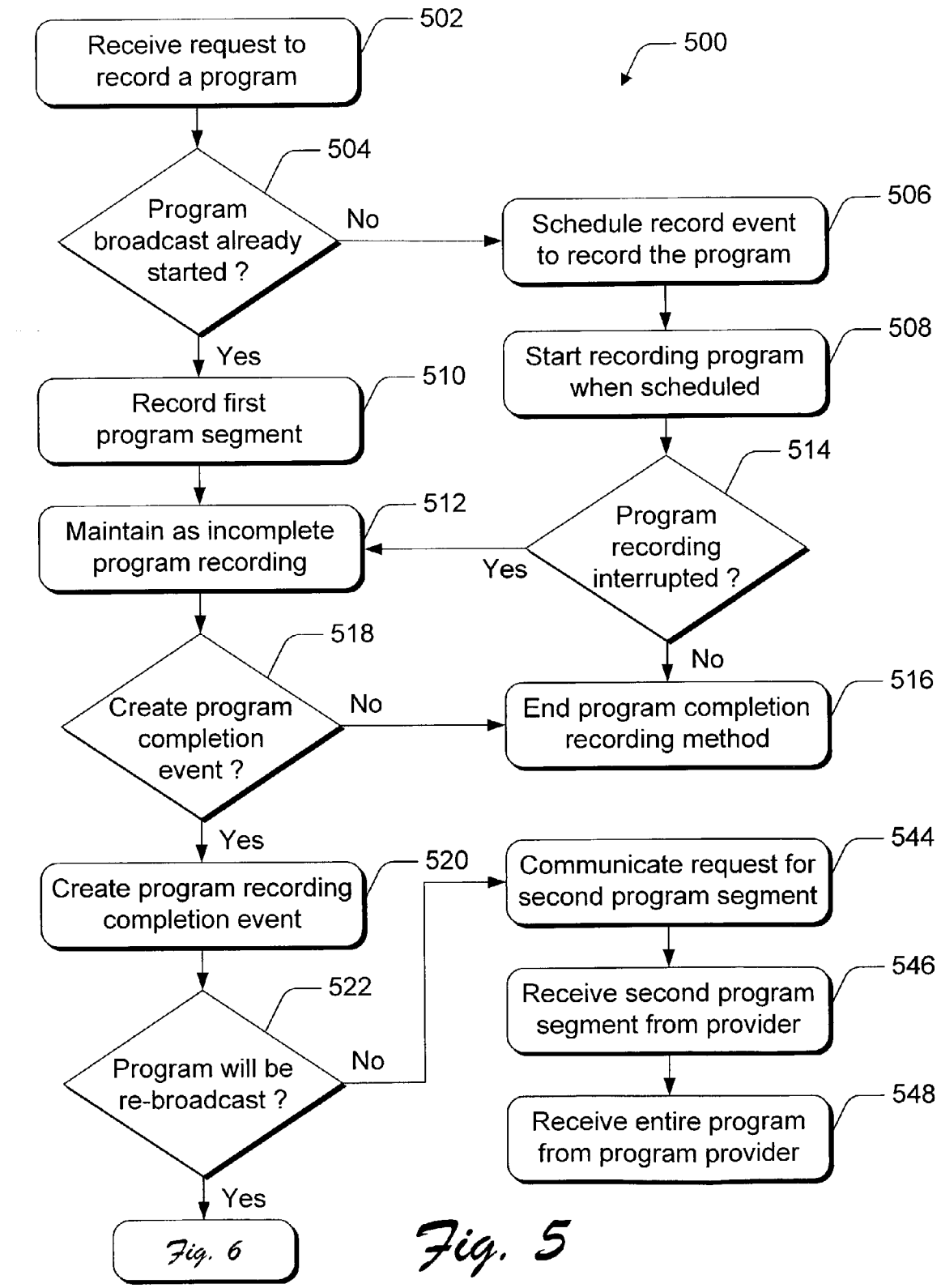
FIGS. 5 and 6 illustrate a flow diagram of a method for a program recording completion system.
Figure 6:
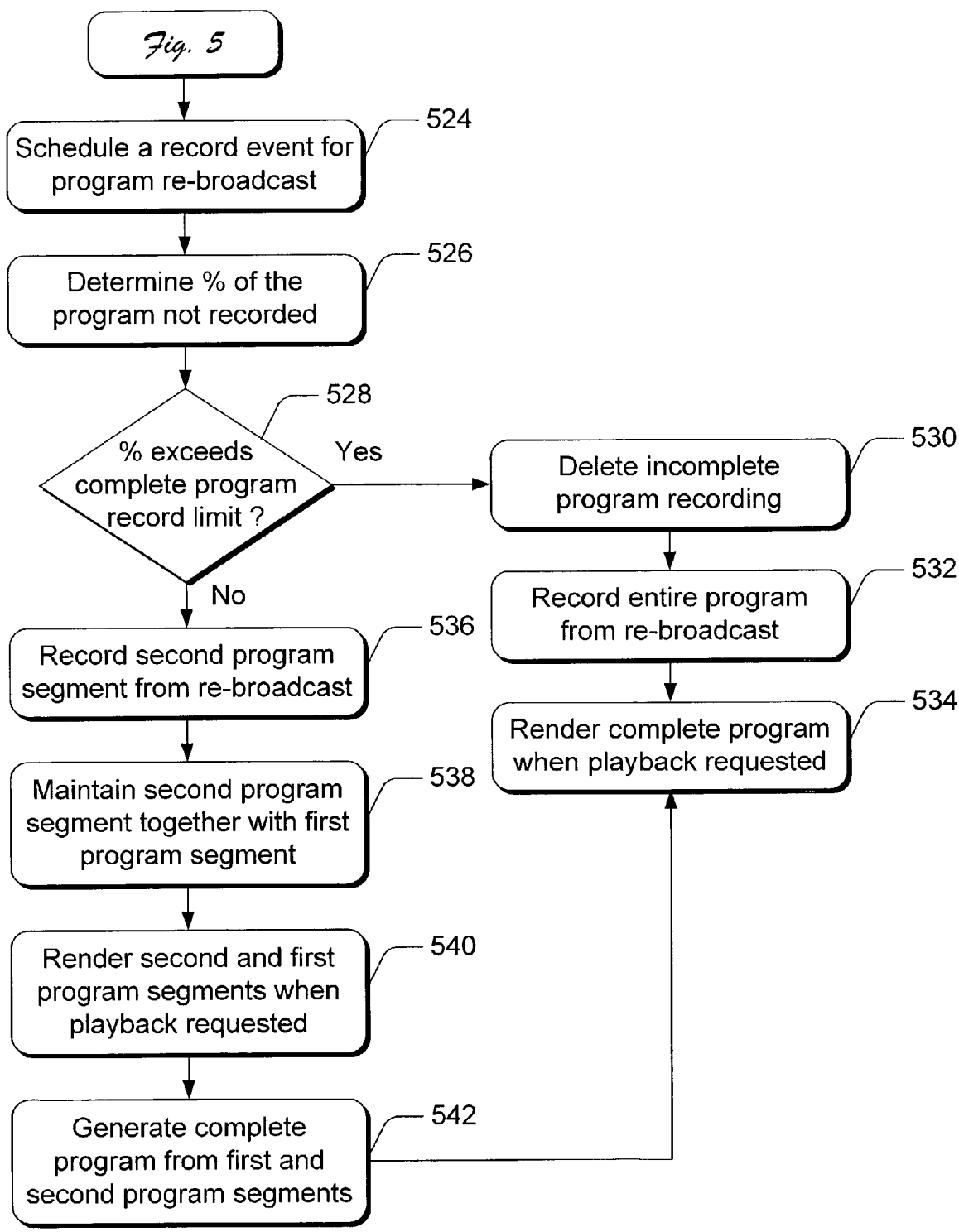

FIGS. 5 and 6 illustrate a method 500 for a program recording completion system. The order in which the method is described is not intended to be construed as a limitation, and any number of the described method blocks can be combined in any order to implement a method for the system. Furthermore, the method can be implemented in any suitable hardware, software, firmware, or combination thereof.

At block 502, a request to record a program is received. A viewer can input a request to client device 108 to record a program with remote control input device 204, for example (FIG. 2). At block 504, a determination is made as to whether a broadcast of the program has already started. For example, recording application 302 determines from EPG application 324 and program data 120 whether the broadcast for the requested program has already started. If the broadcast of the program has not already started (i.e., "no" from block 504), a program record event is scheduled at block 506 to record the program when it is broadcast. At block 508, the program recording is started when scheduled.

If the broadcast of the program has already started (i.e., "yes" from block 504), a first program segment is recorded at block 510, and the first program segment is maintained as an incomplete program recording at block 512. For example, when a viewer begins watching a program and decides to record the program after it has already started, client device 108 receives the request to record the program, and recording application 302 initiates that the remainder of the program broadcast be recorded and that this first program segment be maintained as an incomplete program recording 318 in disk drive 312 (FIG. 3).

At block 514, a determination is made as to whether a scheduled program recording (block 508) is interrupted. For example, a viewer may stop a scheduled program recording before the program broadcast is complete, or system resources may became unavailable to continue with the program recording. Further, a program recording may be incomplete due to system power failure, due to a loss of the broadcast communication, or due to any number of other interruption events not within a viewer's control. If the scheduled program recording is not interrupted (i.e., "no" from block 514), the method for program recording completion is ended at block 516. If the scheduled program recording is interrupted (i.e., "yes" from block 514), the first program segment (e.g., the start of the program recording at block 508) is maintained as an incomplete program recording at block 512.

If a request is received to record a program and the program broadcast has already started (blocks 502 and 504), the first program segment recorded at block 510 does not include the beginning of the program. Alternatively, if a program recording is started as scheduled and the program recording is interrupted (blocks 508 and 514), the first program segment recorded at block 510 does not include the ending of the program. A subsequent program segment can be recorded to include the beginning of the program which can be combined with a first program segment that is recorded after the program broadcast has already started, or the subsequent program segment can include the ending of the program which can be combined with a first program segment that is interrupted during recording.

At block 518, a determination is made as to whether a program recording completion event should be created. A program recording completion event, such as completion event 402(1) in data structure 400 (FIG. 4), can be created by recording application 302 to initiate automatically completing an incomplete program recording. A determination whether to create a program recording completion event for a particular incomplete program recording can be based on one or more optional criteria. For example, a completion event 402(1) can be created if a time difference (e.g., missed-recording time 422) between when the program broadcast started 420 and when the incomplete program recording started 418 is greater than a missed-recording time limit. The missed-recording time limit can be a default application value, or can be a viewer-defined value.

For example, if a program broadcast starts at 9:00 p.m. and a viewer watches ten minutes of the program before deciding to record the program at 9:10 p.m., the missed-recording time is ten minutes. If the missed-recording time limit has been defined to be five minutes by the viewer (i.e., the viewer does not want a recorded program to be missing more than five minutes of the beginning), then a program recording completion event would be created because the ten minutes of missed-recording time exceeds the missed-recording time limit by five minutes.

Further, a completion event 402(1) can be created if a category of the program 128 is designated for program recording completion. The program categories, such as a movie, sporting event, news program, and the like, that are designated for program recording completion can be application defaults of the program recording completion system, or the program categories designated for program recording completion can be viewer-defined. For example, a program category "sporting event" may not be designated for program recording completion because typically viewers are interested in the outcome of a sporting event and may not be concerned with missing the first ten minutes of the program. However, a program category "movie" may be designated for program recording completion if the first ten minutes of a movie are not initially recorded because the outcome of the movie plot may be dependent on the first ten minutes of the movie.

If a program recording completion event should not be created (i.e., "no" from block 518), the method for program recording completion is ended at block 516 (i.e., an incomplete program recording is maintained for viewing and the beginning of the program will not automatically be recorded to complete the program recording). If a program recording completion event should be created (i.e., "yes" from block 518), a program recording completion event corresponding to the incomplete program recording is created at block 520. For example, recording application 302 creates the program recording completion event 402(1) in data structure 400 which includes a first time 418 that indicates when during the program broadcast the incomplete program recording started, and further includes a second time 420 that indicates when the program broadcast started.

At block 522, a determination is made as to whether the program will be re-broadcast. For example, to determine whether the program will be re-broadcast, recording application 302 compares a composite key 404 of the program with EPG data in an electronic program guide 324. If the program will be re-broadcast (i.e., "yes" from block 522), a record event to record all or part of the program re-broadcast is scheduled at block 524 (FIG. 6). For example, recording application 302 schedules a recording of the program re-broadcast with program re-broadcast information 416. The program re-broadcast information 416 can include the date(s), time(s), broadcast channel, and similar program information that may be used to schedule a program recording. Recording application 302 can schedule the record event to record the entire program re-broadcast, or the record event can be scheduled to record a second program segment when the program is re-broadcast, such as the beginning of the program for the missed-recording time 422.

At block 526, a percentage of the program that was not recorded when the first program segment was recorded is determined. For example, recording application 302 determines the missed-recording time 422 which is the difference between when the program broadcast started 420 and when during the program broadcast the incomplete program recording started 418. The percentage of the program that was not recorded is equal to the missed-recording time 422 divided by the total program broadcast time 424.

At block 528, a determination is made as to whether the percentage of the program not recorded exceeds a complete program record limit. For example, recording application 302 determines if the percentage of the program not recorded 426 is greater than a complete program record limit 428. For some programs, such as a three-hour sporting event or a two-hour movie, it may be a better use of system resources to record just the segments of the program that were not initially recorded, such as the first fifteen minutes of either program. Alternatively, if the first thirty minutes of a one-hour program are not initially recorded, it may be a better use of the system resources to record the entire one-hour re-broadcast of the program rather than recording just a program segment and then generating a complete program recording from the program segment and incomplete program recording.

If the percentage of the program not recorded exceeds the complete program record limit (i.e., "yes" from block 528), the incomplete program recording is deleted at block 530, and at block 532, the program re-broadcast is recorded to create a complete program recording. Recording application 302 deletes the incomplete program recording from disk drive 312 and maintains the complete program recording in disk drive 312 as a program recording 318. At block 534, the complete program recording is rendered when a request to playback the program is received.

If the percentage of the program not recorded does not exceed the complete program record limit (i.e., "no" from block 528), a second program segment is recorded at block 536 when the program is re-broadcast and, at block 538, the second program segment is maintained together with the first program segment. For example, recording application 302 initiates that the second program segment be recorded and that the second program segment be maintained as a second incomplete program recording 318 in disk drive 312. The first program segment and the second program segment are together a complete program recording of the program.

At block 540, the second program segment is rendered along with the first program segment when receiving a request to playback the program. For example, recording application 302 initiates that the two program segments are rendered for display when a viewer request to watch the recorded program is received. In this example, the second program segment (e.g., the beginning of the program) is rendered for the duration of the missed-recording time 422 followed by the incomplete program recording (e.g., the first program segment) for the remaining program recording.

Alternatively to block 540, a complete program recording is generated that includes the first program segment and the second program segment at block 542. For example, recording application 302 can implement a frame pattern recognition algorithm to combine the first program segment with the second program segment. Further, an MPEG-based algorithm can be implemented to combine MPEG sections of the program segments to generate a complete program recording, or one common content stream. Again, at block 534, the complete program recording is rendered when a request to playback the program is received.

It is to be appreciated that, although only first and second program segments are described in this example method for program recording completion, any number of program segments can be recorded from one or more re-broadcasts of a program. For example, a viewer may begin watching a program and initiate a record event for the program after the broadcast of the program has already started. Further, the incomplete program recording may be interrupted near the end of the program broadcast, in which case, both the beginning and the ending of the program are not recorded. Recording application 302 can initiate recording a second program segment (i.e., the beginning of the incomplete program recording) and a third program segment (i.e., the ending of the incomplete program recording). In this example, the incomplete program recording and the second and third program segments are together a complete program recording.

If the program will not be re-broadcast (i.e., "no" from block 522) (FIG. 5), a request is communicated to a program provider for a second program segment at block 544. For example, recording application 302 communicates a request for a second program segment to content provider 102. At block 546, the second program segment is received from the program provider. Alternatively, at block 548, the entire program is received from the content provider. The second program segment and/or the entire program can be received from the program provider via a back-channel communication link 338 (FIG. 3), or from any other type of two-way communication link.

Conclusion

Although the invention has been described in language specific to structural features and/or methods, it is to be understood that the invention defined in the appended claims is not necessarily limited to the specific features or methods described. Rather, the specific features and methods are disclosed as preferred forms of implementing the claimed invention.

The invention claimed is:

1. A program recording completion system, comprising:
a memory component configured to maintain an incomplete program recording of a program broadcast for viewing; and
a recording application configured to determine whether to create a program recording completion event corresponding to the incomplete program recording, the recording application further configured to:
create the program recording completion event;
determine whether the program will be re-broadcast;
determine a missed-recording time which is the difference between when the program broadcast started and when during the program broadcast the incomplete program recording started;
determine a percentage of the missed-recording time to a total program broadcast time; and
initiate recording the program re-broadcast to create a complete program recording if the percentage is greater than a complete program record limit.

2. A program recording completion system as recited in claim 1, wherein the recording application is further configured to create the program recording completion event to include a first time that indicates when during the program broadcast the incomplete program recording started, and to further include a second time that indicates when the program broadcast started.

3. A program recording completion system as recited in claim 1, wherein the recording application is further configured to create the program recording completion event if a time difference between when the program broadcast started and when the incomplete program recording started is greater than a missed-recording lime limit.

4. A program recording completion system as recited in claim 1, wherein the recording application is further configured to create the program recording completion event if a category of the program is designated for program recording completion.

5. A program recording completion system as recited in claim 1, wherein the recording application is further configured to initiate recording the program re-broadcast to create a complete program recording.

6. A program recording completion system as recited in claim 1, wherein the recording application is further configured to initiate recording a segment of the program when the program is re-broadcast, the program segment and the incomplete program recording maintained with the memory component as a complete program recording.

7. A program recording completion system as recited in claim 1, wherein the recording application is further configured to initiate recording a segment of the program when the program is re-broadcast if the percentage is less than the complete program record limit.

8. A program recording completion system as recited in claim 1, wherein the recording application is further configured to compare a composite key of the program with an electronic program guide to determine whether the program will be re-broadcast, the composite key including at least one of a program title, a program description, a broadcast channel number, a program broadcast start time, and a program rating.

9. A program recording completion system as recited in claim 1, wherein the recording application is further configured to compare a composite key of the program with an electronic program guide to determine whether the program will be re-broadcast, and schedule a record event to record the program re-broadcast.

10. A program recording completion system as recited in claim 1, wherein the recording application is further configured to compare a composite key of the program with an electronic program guide to determine whether the program will be re-broadcast, and schedule a record event to record a segment of the program when the program is re-broadcast.

11. A program recording completion system as recited in claim 1, wherein the recording application is further configured to record a segment of the program when the program is re-broadcast, and generate a complete program recording that includes the program segment and the incomplete program recording.

12. A digital video recorder comprising the program recording completion system as recited in claim 1.

13. A client device in a television system comprising the program recording completion system as recited in claim 1.

14. A client device, comprising:
a recording application configured to initiate recording a first program segment when a program is broadcast;
a memory component configured to maintain the first program segment as an incomplete program recording; and
the recording application further configured to:
determine a percentage of missed-recording time to a total program broadcast time of the program;
communicate a request for a second program segment to a content provider to create a complete program recording if the percentage is greater than a complete program record limit;
receive the second program segment from the content provider; and
initiate recording at least the second program segment and store the second program segment in the memory component.

15. A client device as recited in claim 14, wherein the recording application is further configured to determine whether the program will be re-broadcast and initiate recording the second program segment when the program is re-broadcast.

16. A client device as recited in claim 14, wherein the recording application is further configured to:
determine whether the program will be re-broadcast;
initiate recording the program re-broadcast; and
store the recording of the program re-broadcast in the memory component as a complete program recording.

17. A client device as recited in claim 14, wherein the recording application is further configured to combine the first program segment with the second program segment to form a complete program recording.

18. A client device as recited in claim 17, wherein the recording application implements a frame pattern recognition algorithm to combine the first program segment with the second program segment.

19. A client device as recited in claim 14, wherein the recording application is further configured to receive the second program segment from the content provider via a back-channel communication link.

20. A client device as recited in claim 14, wherein the recording application is further configured to receive the second program segment from the content provider via a two-way communication link between the client device and the content provider.

21. A client device as recited in claim 14, wherein the recording application is further configured to:
receive the entire program from the content provider; and
store the entire program in the memory component as a complete program recording.

22. A client device as recited in claim 14, embodied as a digital video recorder.

23. A method, comprising:
receiving a request to record a program;
determining whether a broadcast of the program has already started;

recording a first program segment to create an incomplete program recording if the broadcast of the program has already started;

determining whether to create a program recording completion event;

determining a missed-recording time which is the difference between when the program broadcast started and when during the program broadcast the incomplete program recording started;

determining a percentage of the missed-recording time to a total program broadcast time; and recording a re-broadcast of the program to create a complete program recording if the percentage is greater than a complete program record limit.

24. A method as recited in claim 23, further comprising creating the program recording completion event to include a first time that indicates when during the program broadcast the incomplete program recording started, and to further include a second time that indicates when the program broadcast started.

25. A method as recited in claim 23, wherein the program recording completion event is created if a time difference between when the program broadcast started and when the incomplete program recording started is greater than a missed-recording time limit.

26. A method as recited in claim 23, wherein the program recording completion event is created if a category of the program is designated for program recording completion.

27. A method as recited in claim 23, further comprising determining when the program will be re-broadcast and recording the program re-broadcast to create the complete program recording.

28. A method as recited in claim 23, further comprising determining when the program will be re-broadcast, and recording a second program segment such that the first program segment and the second program segment are together the complete program recording.

29. A method as recited in claim 23, further comprising recording a second program segment when the program is re-broadcast if the percentage is less than the complete program record limit.

30. A method as recited in claim 23, further comprising determining when the program will be re-broadcast by comparing a composite key of the program with an electronic program guide, the composite key including at least one of a program title, a program description, a broadcast channel number, a program broadcast start time, and a program rating.

31. A method as recited in claim 23, further comprising determining when the program will be re-broadcast by comparing a composite key of the program with an electronic program guide, and scheduling a record event to record the program re-broadcast.

32. A method as recited in claim 23, further comprising determining when the program will be re-broadcast by comparing a composite key of the program with an electronic program guide, and scheduling a record event to record a second program segment when the program is re-broadcast.

33. A method as recited in claim 23, further comprising:
determining when the program will be re-broadcast;
recording a second program segment when the program is re-broadcast;
maintaining the second program segment together with the first program segment;

rendering the second program segment along with the first program segment when receiving a request to playback the program.

34. A method as recited in claim 23, further comprising:
determining when the program will be re-broadcast;
recording a second program segment when the program is re-broadcast;
generating a complete program recording that includes the first program segment and the second program segment.

35. One or more computer-readable media comprising computer-executable instructions that, when executed, direct a client device to perform the method of claim 23.

36. One or more computer-readable media comprising computer-executable instructions that, when executed, direct a digital video recorder to perform the method of claim 23.

37. A method, comprising:
recording a first program segment when a program is broadcast;
maintaining the first program segment as an incomplete program recording;
determining a percentage of missed-recording time to a total program broadcast time of the program;
creating a program recording completion event corresponding to the incomplete program recording if the percentage is greater than a complete program record limit;
communicating a request to a content provider for the second program segment;
receiving the second program segment from the content provider; and
recording at least the second program segment of the program.

38. A method as recited in claim 37, wherein the second program segment is recorded when the program is re-broadcast such that the first program segment and the second program segment are together a complete program recording.

39. A method as recited in claim 37, further comprising recording a third program segment, and wherein the second program segment and the third program segment are recorded when the program is re-broadcast such that the first, second, and third program segments are together a complete program recording.

40. A method as recited in claim 37, further comprising receiving the second program segment from the content provider via a back-channel communication link.

41. A method as recited in claim 37, further comprising receiving the second program segment from the content provider via a two-way communication link.

42. A method as recited in claim 37, further comprising receiving the entire program, and wherein recording the second program segment includes recording the entire program.

43. A method as recited in claim 37, wherein creating the program recording completion event includes maintaining a first time that indicates when the recording of the first program segment started and a second time that indicates when the program broadcast started.

44. A method as recited in claim 37, further comprising deleting the incomplete program recording, and wherein recording the second program segment includes recording the entire program when the program is re-broadcast to create a complete program recording.

45. A method as recited in claim 37, further comprising:
determining the missed-recording time which is the difference between when the program broadcast started and when the recording of the first program segment started; and
recording the second program segment includes recording the entire program when the program is re-broadcast to create a complete program recording.

46. A method as recited in claim 37, further comprising determining when the program will be re-broadcast by comparing a composite key of the program with an electronic program guide.

47. A method as recited in claim 37, further comprising determining when the program will be re-broadcast by comparing a composite key of the program with an electronic program guide, the composite key including at least one of a program title, a program description, a broadcast channel number, a program broadcast start time, and a program rating.

48. A method as recited in claim 37, further comprising maintaining the second program segment together with the first program segment, and rendering the second program segment along with the first program segment when receiving a request to playback the program.

49. A method as recited in claim 37, further comprising generating a complete program recording that includes the first program segment and the second program segment, and rendering the complete program recording when receiving a request to playback the program.

50. One or more computer-readable media comprising computer-executable instructions that, when executed, direct a client device to perform the method of claim 37.

51. One or more computer-readable media comprising computer-executable instructions that, when executed, direct a digital video recorder to perform the method of claim 37.

52. A program recording completion system, comprising:
means for recording a first program segment when a program is broadcast;
means for determining a percentage of missed-recording time to a total program broadcast time of the program, and if the percentage is greater than a complete program record limit:
means for determining when the program will be re-broadcast;
means for recording a second program segment when the program is re-broadcast;
means for receiving the second program segment from a content provider; and
means for generating a complete program recording that includes the first program segment and the second program segment.

53. A program recording completion system as recited in claim 52, further comprising means for comparing a composite key of the program with an electronic program guide to determine whether the program will be re-broadcast.

54. A program recording completion system as recited in claim 52, further comprising means for frame pattern recognition to combine the first program segment and the second program segment to generate the complete program recording.

55. A program recording completion system as recited in claim 52, further comprising means for rendering the second program segment along with the first program segment when receiving a request to playback the program.

* * * * *